May 2, 1950          J. F. MEISSNER          2,505,982
HOPPER CONTROL GATE FOR SHIP UNLOADERS
Filed Jan. 26, 1948          3 Sheets-Sheet 1
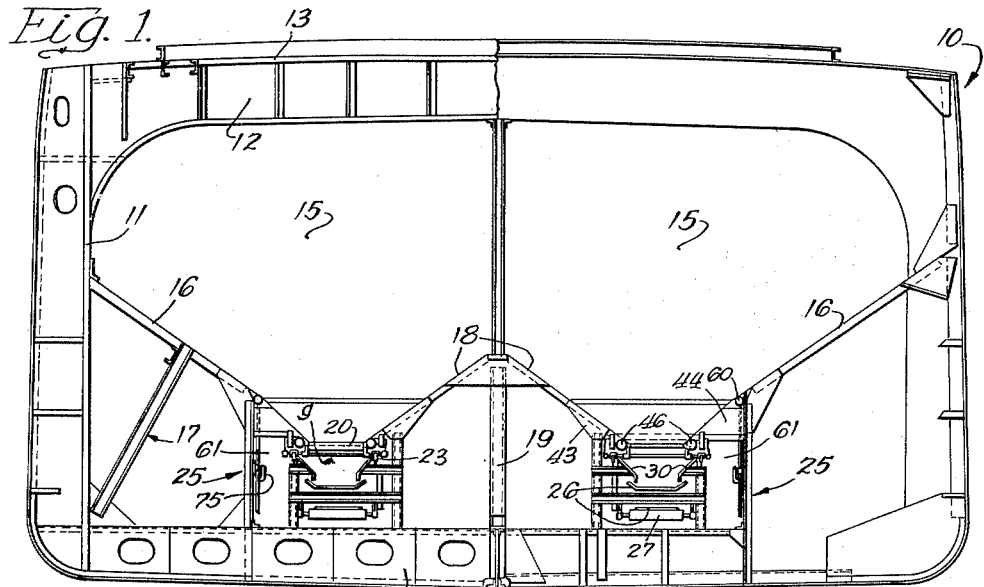
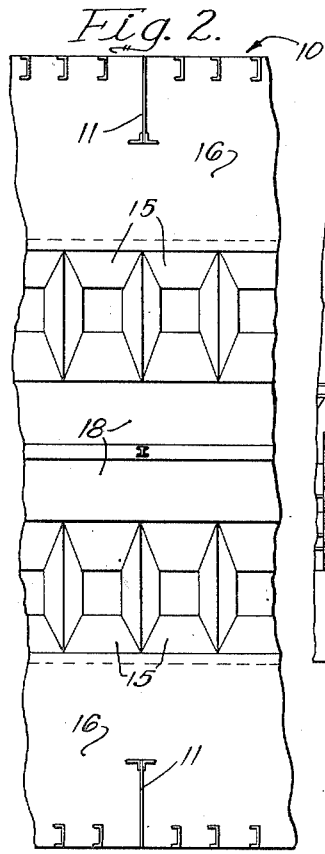
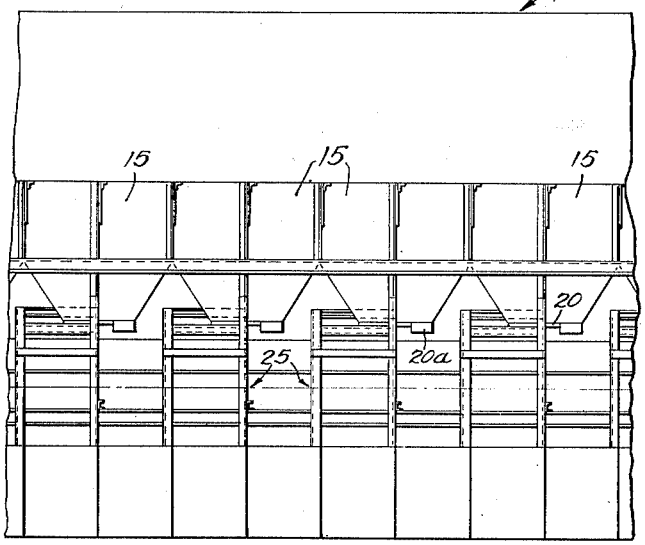
Inventor:
John F. Meissner
By Brown, Jackson, Boettcher & Dienner
Attys.

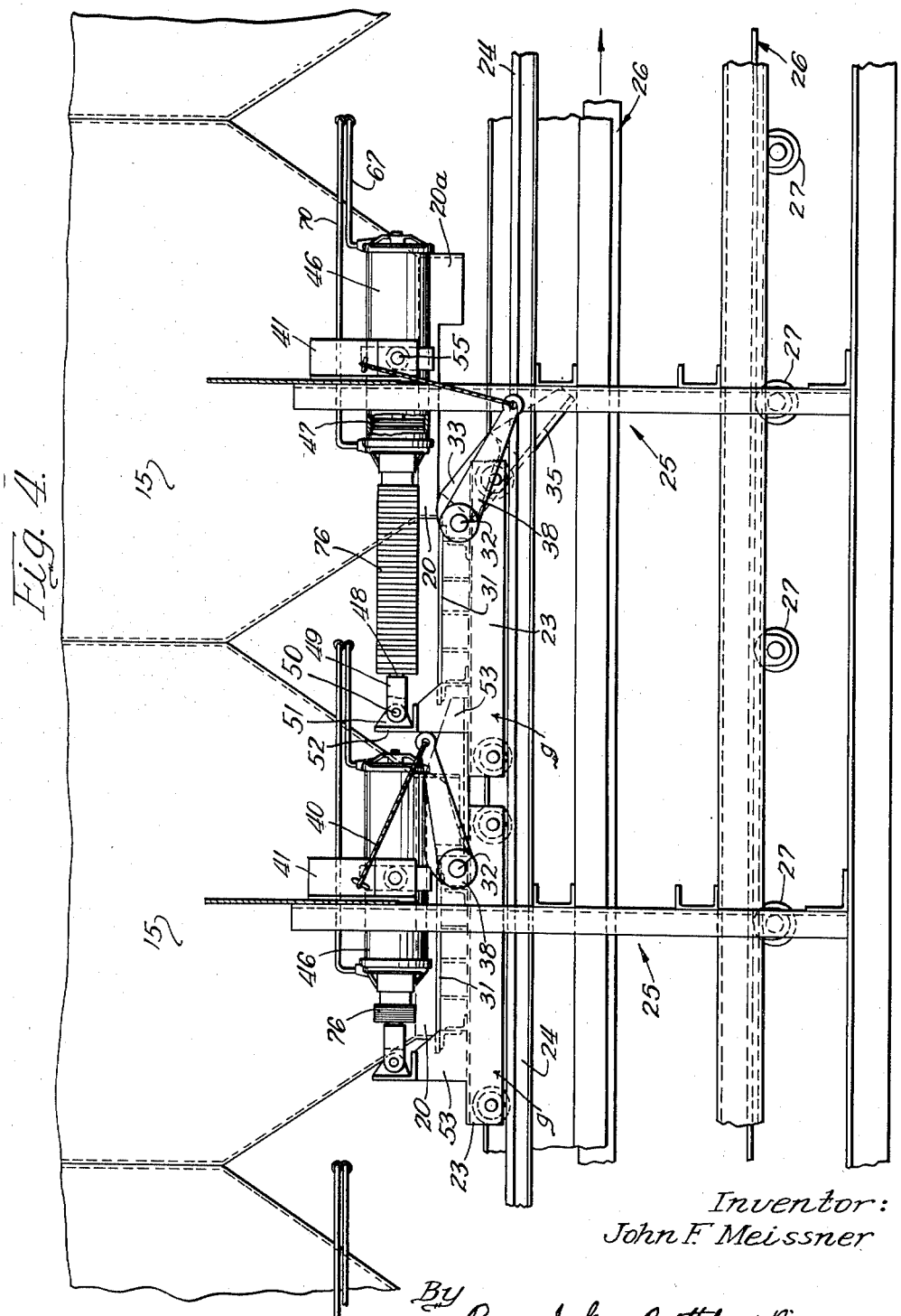

May 2, 1950  J. F. MEISSNER  2,505,982
HOPPER CONTROL GATE FOR SHIP UNLOADERS
Filed Jan. 26, 1948  3 Sheets-Sheet 3
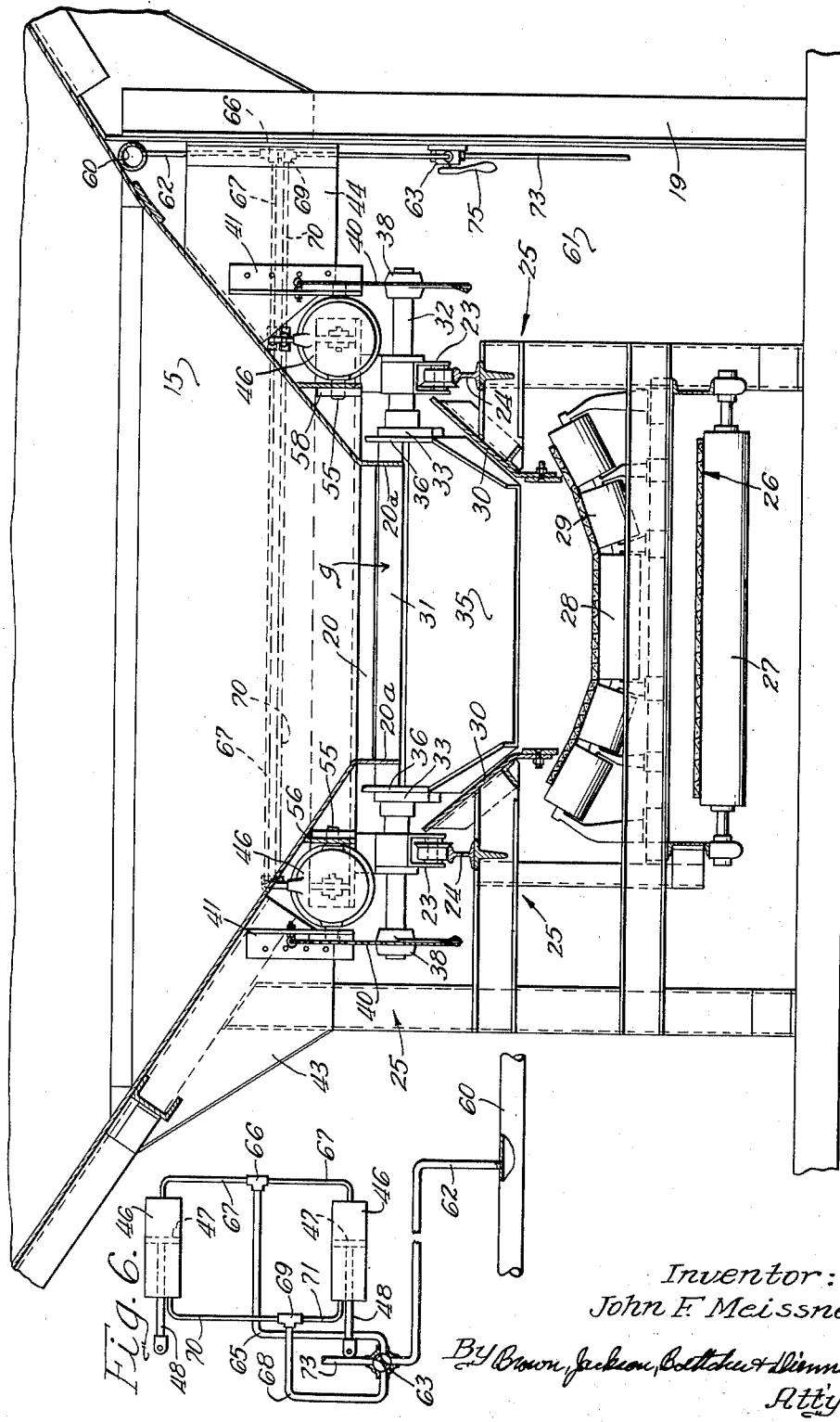
Inventor:
John F. Meissner
By Brown, Jackson, Boettcher & Dienner,
Attys.

Patented May 2, 1950

2,505,982

UNITED STATES PATENT OFFICE 2,505,982

HOPPER CONTROL GATE FOR SHIP UNLOADERS

John F. Meissner, La Grange, Ill., assignor to Bradley Transportation Company, Rogers City, Mich., a corporation of West Virginia Application January 26, 1948, Serial No. 4,232

11 Claims. (Cl. 214—15)

This invention relates to ships of the self-unloading type, and has to do with hopper bottom control gates and the operating means therefor in such ships.

Ships of the above type, usually referred to as self-unloaders, are used for handling large quantities of bulk materials such as limestone, gypsum, ore, coal and the like. In the conventional bulk cargo vessels, not self-unloaders, the cargo is placed in the hold on what is known as the tank top, at the bottom of the hull, and is discharged from the vessel by digger buckets or other suitable mechanical means at the dock. That is objectionable, since the unloading operation requires considerable time, during which the ship is tied at the dock and the number of trips which it can make during a given period of time is correspondingly reduced. That is of particular importance in respect to shipping which is seasonal, as on the Great Lakes for example, where it is particularly desirable that a bulk cargo ship make as many trips as possible during the available shipping season.

Self-unloader ships are provided with hoppered holds, the hoppers of which have hopper bottoms from which the material is discharged onto conveyors. The material receiving conveyors are included in a conveyor system by means of which the cargo can be discharged at the dock in much less time than is required to discharge the cargo of the conventional type of ship above mentioned. In the self-unloader ship the hoppers unavoidably reduce somewhat the available cargo space. It is of importance, therefore, that the hoppers and the hopper bottoms be placed as closely together as is practicable and extend downward as near the tank top as is permissible, in order that the cargo space may be as great as possible and the center of gravity of the ship, when loaded, may not be objectionably high. The hopper bottoms are controlled by individual gates actuated by operators in tunnels underlying the hoppers. In present day self-unloader ships the hopper bottom gates are operated manually, due to the fact that it has not been considered practicable to utilize power means for operating the gates, in the necessarily restricted space available beneath the hoppers and between the hopper bottoms. The accepted practice in constructing bulk cargo ships is to space the frames on twelve foot centers, and in self-unloader ships the hoppers are spaced on six foot centers, which is of importance in obtaining maximum hold capacity and assuring that the hoppers will be self-cleaning. The hopper bottom openings should be large, to assure rapid delivery of the material from the hoppers to the conveyors, and an opening three feet square is the accepted practice. The flow of the material through the hopper bottom opening is irregular, necessitating continual operation and adjustment of the gate for delivering the material to the conveyor at the most efficient rate. Manual operation of the gate is fatiguing and slow, and the unloading apparatus cannot be utilized to best advantage when manually operated hopper bottom gates are utilized as at present. Further, due to the fatiguing character of the work, it often is difficult to obtain men to do that work. While the desirability of power operated hopper bottom gates has been recognized, it has heretofore been considered impracticable to provide power means for that purpose in the necessarily restricted space available beneath the hoppers and between the hopper bottoms.

My invention is directed to the provision of power operated hopper bottom gates in a self-unloader ship without sacrifice of valuable cargo space, so that a ship of a given size equipped with the gate operating means of my invention has at least as much hold or cargo space as a similar ship of the same size in which the hopper gates are operated manually as at present. To that end I provide, in association with each hopper bottom gate, power cylinder means for operating it under control of an operator in the tunnel alongside the gate. More particularly, and preferably, I provide a power cylinder at each side of each gate, with operating connection thereto, the cylinders being so disposed relative to the hopper bottoms and the travel of the gate, and the maximum stroke of the cylinders being such, that the gate can be closed or opened to any desired extent without risk of interference by an adjacent gate. Further objects and advantages of my invention will appear from the detail description.

In the drawings:

Figure 1 is a semi-diagrammatic vertical cross sectional view, taken in two different planes, of the hull of a self-unloader ship provided with the hopper bottom gate operating means of my invention;

Figure 2 is a semi-diagrammatic fragmentary plan view with the deck structure omitted, of the hull of Figure 1;

Figure 3 is a fragmentary semi-diagrammatic fore-and-aft vertical sectional view of the hull of Figure 1, taken in a plane adjacent the frames at one side of the hull and looking inboard;

Figure 4 is a side view, on an enlarged scale and with certain parts shown in section and certain other parts broken away, of two hoppers and hopper bottoms with power operated gates applied thereto in accordance with my invention, and associated parts;

Figure 5 is a vertical cross sectional view, on an enlarged scale, of a hopper bottom and a power operated gate therefor embodying my invention, and associated parts, certain parts being shown in elevation and certain other parts being broken away; and Figure 6 is a diagram of the piping connections to the power cylinders for one of the gates, and associated parts.

I have illustrated the power operated hopper bottom gate of my invention as applied to a self-unloader ship comprising a hull 10, which is, in general, of known construction and a brief description of which will suffice. The hull 10 comprises frames 11 spaced on twelve foot centers and associated sub-frames and stanchions, the usual skin or plates applied to the frames and the sub-frames, the deck structure 12 provided with suitably disposed hatch openings 13, and an inner bottom defining with the outer bottom and associated parts a tank structure 14, as is known. The hull 10 is hoppered, with the hoppers 15 spaced on six foot centers and arranged in two series extending fore-and-aft of hull 10 at opposite sides of and equidistant from the keel line thereof. Plating 16, supported by a suitable frame structure 17 and extending fore-and-aft of hull 10, extends from the sides of the hull downward and inward, at an angle of approximately 35° to the hoppers 15, and plating 18, supported by a suitable framework including stanchions 19, also inclined at an angle of approximately 35°, extends from the keel line of hull 10 downward and outward to the hoppers 15. The hoppers 15 are of approximately inverted frusto-pyramidal shape and each is provided at its lower end with a depending flange 20 constituting the hopper bottom and defining a discharge opening which, in practice, is three feet square, the hopper openings being spaced on six foot centers. The hold space of hull 10 is divided interiorly, by transverse bulk heads (not shown), into a plurality of separate holds, as is known.

The discharge opening of the respective hoppers 15 is controlled by a gate g comprising a wheel mounted carriage 23 which travels upon the rails 24 of a track supported by a suitable framework 25, which also supports, in part, the hoppers 15. The framework 25 also supports an endless belt conveyor 26 mounted thereon by suitably disposed lower rollers 27 and sets of upper rollers 28 and 29, the upper rollers being disposed to impart a transversely dished or trough shape to the upper run of the conveyor. Conveyors of this type are well known and further description thereof is unnecessary. The conveyor 26 may be of any suitable type and, as will be understood, is disposed in underlying relation to the track rails 24, for reception of material delivered thereto from the hoppers. Preferably, downwardly and inwardly inclined aprons 30 are supported by the frame structure 25, and at opposite sides of the upper run of belt conveyor 26, for directing the material onto the upper run thereof. The conveyor 26, as well as the track including the rails 24, extends fore-and-aft of the hull 10 and is driven, by appropriate means, in such direction that the upper run of the belt travels forward. As previously stated, the conveyor 26 is included in a conveyor system of known type whereby the ship is rendered self-unloading. As will be understood, there is a track and a conveyor beneath each fore-and-aft series of hoppers 15, at opposite sides of and equidistant from the keel line of the hull.

The carriage 23 is provided with a closure plate 31 mounted thereon at the proper height to close the aftward portion of the hopper bottom opening, when carriage 23 is in its forward position. A cross shaft 32 is rockably mounted in the forward portion of carriage 23 and has fixed thereto two arms 33 extending forwardly from shaft 32 alongside a delivery chute 35 of substantially U-shape in cross section, the arms 33 being fixed to the upwardly extending side flanges 36 of chute 35. When the chute 35 is in its full raised position, to which it is moved in the travel of carriage 23 from an aftward position to its full forward position, as will be explained more fully later, the chute 35 extends about a downward extension 20a of the hopper bottom flange 20, at the forward portion of the hopper bottom. With the carriage 23 in its full forward position, as shown at the left of Figure 4, the plate 31, which extends forward a slight distance beyond shaft 32 in overlying relation thereto, and the chute 35, together provide closure means for the hopper bottom effective for preventing discharge of material therefrom. In that connection, it will be noted that the forward portion of plate 31 is curved forward and downward over shaft 32, with its lower edge disposed in proximity to the upper face of the bottom wall of chute 35, when the latter is in fully raised position.

The shaft 32 projects outward an appreciable distance beyond each side of the carriage 23, as is shown more clearly in Figure 5, there being an arm 38 fixed to each end of shaft 32 and extending generally forward therefrom. A flexible member 40 of suitable length, such as a length of chain or a length of steel cable, is anchored at its forward end to the forward end of each arm 38, and is anchored at its upper end to an angle bracket 41. One of the brackets 41 is secured to a gusset plate 43 constituting an element of the frame structure 25, and the other bracket 41 is secured to a plate 44 extending between and secured to a side wall of hopper 15 and one of the stanchions 19. As is shown more clearly in Figure 4, the brackets 41 are disposed at about the mid-length, fore-and-aft, of the hopper 15, so that the flexible members 40 extend from the forward ends of arms 38 upward and aftward to the brackets 41, when the carriage 23 is in its full forward position, shown at the left of Figure 4.

In order to discharge material from the hopper onto the upper run of the conveyor 26, the carriage 23 is moved aftward from its full forward position shown at the left of Figure 4, to proper extent for discharging the material from the hopper onto the upper run of the conveyor at the desired rate. In the aftward travel of the carriage 23, the chute 35 swings downward, under control of the flexible members 40, and when the carriage 23 reaches the limit of its aftward travel, shown at the right of Figure 4, the chute 35 occupies its position thereshown. The hopper bottom opening is then completely uncovered or open, for maximum discharge of material onto the upper run of the conveyor. By moving the carriage 23 to proper extent in either closing or opening direction, the extent to which the hopper bottom is opened may be accurately controlled with corresponding accuracy in controlling the rate of flow of the material from the hopper onto the conveyor. The chute 35, when opened, is inclined downward and forward so as to deliver the material to the conveyor in the direction of travel thereof, indicated by the arrow in Figure 4. In the travel of the carriage 23 from an aftward position to its full forward position, the chute 35 is swung upward and forward by the flexible members 40, in cooperation with arms 38 and associated parts, so as to be raised into its uppermost position shown at the left of Figure 4, when the carriage 23 reaches its most forward position.

In self-unloader ships in which the hopper bottom gates are operated manually, the load of the material on the gate and the friction presented thereby frequently require considerable physical effort in operation of the gates, which is quite fatiguing, as previously stated. In some cases, where the bulk material in the hopper contains considerable fines, the gate may be jammed by the fines between the gate and the hopper bottom, requiring the efforts of two men to start the gate open. Further, the manual operation of the gate is unsatisfactory, since it is rather slow and often it is practically impossible to adjust the gates manually sufficiently rapidly to control accurately the rate of discharge of the material from the hopper.

Though it has generally been accepted that it is impracticable to provide power means for operating the gates, due to the restricted space available beneath the hoppers and between the hopper bottoms, I have found that by properly relating the plate 31 and the chute 35 of the respective gates 23 and properly positioning power cylinders relative to the gates, it is possible to install power means for operating the gates within the restricted space available. The power cylinder means which is employed comprises a power cylinder 46 of known construction having a piston 47 operating therein. A piston rod 48, secured to piston 47, is slidable through the aft end of cylinder 46 and has secured to its aft end a clevis 49 which is pivoted at 50 to a lug 51 secured to an angle cross member 52, which is mounted on and secured to brackets 53 extending upward from and secured to carriage 23 adjacent the aft end thereof. Preferably, I provide two cylinders 46, one adjacent each side of carriage 23, each of these cylinders being provided, at opposite sides and approximately the mid-length thereof, with trunnions 55 rockably mounted in brackets 41 and in plates 56 secured to and depending from the hopper 15, the trunnions 55 also extending through blocks 58 welded or otherwise secured to the brackets 41 and to plates 56. The cylinders 46 are thus pivotally mounted for rocking movement to accommodate any slight misalignment of parts.

The power cylinders 46 are pressure fluid operated—either hydraulic or pneumatic. For purposes of description, it may be assumed that the power cylinders are pneumatically operated. A header 60 is suitably mounted in tunnel 61 extending alongside the track and underlying the hoppers, the header 60 also underlying the hoppers, as shown. Header 60 receives a supply of air under suitable pressure from a source of supply of compressed air (not shown) suitably located in the hull 10. An air supply pipe 62 is led off from header 60 adjacent each of the carriages 23. This pipe 62 is connected to one port of a three way valve 63 on a stanchion 19 adjacent the carriage 23. A pipe 65 connects another port of valve 63 to a T 66 connected by pipes 67 to ports at the forward ends or heads of the cylinders 46. A pipe 68 connects another port of valve 63 to a T 69 connected by pipes 70 and 71 to ports at the aftward ends or heads of the cylinders 46. A discharge pipe 73 leads from another port of valve 63 and may discharge at atmosphere, at a suitable point, or may discharge into a suitably disposed container, if the cylinders are operated hydraulically.

When the valve 63 is in its position shown in Figure 6, air under appropriate pressure is admitted to the cylinders 46 forward of the pistons 47 therein, while air is being exhausted from the aftward ends of cylinders 46. The pistons 47 are then moved aft, thereby moving the carriage 23 aft so as to uncover or open the hopper bottom to desired extent. The valve 63 is provided with an operating handle 75 so disposed that the movements of carriage 23 correspond to the movements of handle 75, that is, in order to move carriage 23 aft the handle 75 is moved aft and in order to move the carriage 23 forward the handle 75 is moved forward. In order to accommodate the power cylinders 46, the maximum stroke of the cylinder 46 is approximately two feet and the length of plate 31 of carriage 23 is approximately two feet. Plate 31 thus closes approximately two thirds of the hopper bottom opening, when carriage 23 is in its most forward position, at which time the chute 35 closes the remaining one third of the hopper bottom opening.

The overall length of the cylinder 46 is approximately three feet, in order to have a two foot maximum stroke. By mounting the cylinders 46 at about their mid-length and adjacent the mid-length, fore-and-aft, of the hopper bottom, it is possible to use a power cylinder having a maximum stroke of about two feet without interference between the gates of adjacent hopper bottoms, or between the gates and the power cylinders of adjacent gates. In order to accomplish that, the plate 31 of the carriage 23 should not be of a length fore-and-aft appreciably greater than two thirds of the length of the hopper bottom opening, so that the maximum two foot stroke of the power cylinders will be adequate to move the gate to either its extreme aft position or its most forward position. In that connection, the forward portion of chute 35 tapers forwardly and is of less width than the interior width of the aft end of carriage 23, and the arms 38 are spaced apart a distance somewhat greater than the width of carriage 23. That enables movement of any one of the carriages, selectively, to full open position without interference by the next adjacent carriage, as will be clear from Figure 4. The gate 23 may, of course, be opened or closed, by means of the power cylinders 46, to any extent desired between the two extreme positions stated. Power operation of the gate permits quick and accurate adjustment thereof to regulate the flow or discharge of material from the hopper onto the conveyor, which may thus be kept fully loaded without risk of objectionable overloading. That is conducive to most efficient operation of the conveyor unloading system, so that the ship may be unloaded in a minimum time period. That is of importance, particularly where shipping is seasonal, in respect to the possible number of trips a ship may make during the available season.

Many of the materials carried by self-unloader ships are abrasive in character. It is desirable, therefore, that parts having rubbing contact be protected from such materials. That is particularly true of the power cylinders and the piston rods operating through the aft heads of the cylinders. Accordingly, suitable means is provided to prevent entry between the piston rods and the cylinder head of fines of the materials carried. Broadly, any suitable sealing means may be provided for that purpose. I have shown each of the power cylinders as provided with a bellows structure 75 extending about the piston rod 48 and secured thereto at its aft end, the forward end of bellows structure 75 being secured to the aft cylinder head. This form of sealing means for the piston rod and cylinder head is known and requires no further description here.

It will be clear, from the above, that each of the hoppers 15 provides a supporting structure for a body of comminuted material and has a bottom opening through which such material may be discharged under control of the gate g operating in the manner above described. The gate g and the operating means therefor are particularly suited for use in self-unloader ships, and have been so shown and described as illustrative of the preferred form of my invention. Within the broader aspects of my invention, however, they may be used to advantage for controlling delivery of comminuted material through an opening in a supporting structure, from a body of such material resting upon or supported by that structure.

As will be understood, I have disclosed herein, by way of example only, the preferred form of my invention. It will be understood that changes in detail may be resorted to without departing from the field and scope of my invention, and I intend to include all such variations, as fall within the scope of the appended claims, in this application in which the preferred form only of my invention has been disclosed.

I claim:

1. In a self-unloading ship having a hoppered hold with the openings of the hopper bottoms of predetermined extent fore-and-aft and the lower ends of the hopper bottoms spaced a distance apart approximating the fore-and-aft extent of the hopper bottom openings, tracks underlying the hopper bottoms, conveyors underlying the hopper bottoms below the tracks, and operating tunnels underlying the hoppers extending alongside the tracks; gates individual to the hopper bottoms movable along the respective tracks, said gates respectively comprising a carriage and a closure plate thereon of less extent fore-and-aft than the hopper bottom opening, a discharge member hinged to said carriage for swinging movement perpendicular to said plate extending forward therefrom, power means controlled from the operating tunnel for moving said carriage fore-and-aft along the track to desired extent with the maximum travel of said carriage in either direction less than the distance between the lower ends of adjacent hopper bottoms, said discharge member having a bottom wall cooperating with said plate for closing the hopper bottom opening when said carriage is in substantially its forwardmost position with said discharge member fully raised, and means for raising and lowering said discharge member responsive to travel of said carriage foreward and aftward, respectively, and returning it to fully raised position when said carriage reaches substantially its forwardmost position.

2. In a self-unloading ship having a hoppered hold with the openings of the hopper bottoms of predetermined extent fore-and-aft and the lower ends of the hopper bottoms spaced a distance apart approximating the fore-and-aft extent of the hopper bottom openings, tracks underlying the hopper bottoms, conveyors underlying the hopper bottoms below the tracks, and operating tunnels underlying the hoppers extending alongside the tracks; gates individual to the hopper bottoms movable along the respective tracks, said gates respectively comprising a carriage and a closure plate thereon of less extent fore-and-aft than the hopper bottom opening, a discharge member hinged to said carriage for swinging movement perpendicular to said plate extending forward therefrom, power means controlled from the operating tunnel comprising a cylinder closed at its ends with a piston and a piston rod operating therein, operating connections between said power means and said carriage for moving the latter fore-and-aft along the track to desired extent, the maximum stroke of said piston being such that the maximum travel of said carriage in either direction is less than the distance between adjacent hopper bottoms, said discharge member having a bottom wall cooperating with said plate for closing the hopper bottom opening when said carriage is in substantially its forwardmost position with said discharge member fully raised, and means for raising and lowering said discharge member responsive to travel of said carriage foreward and aftward, respectively, and returning it to fully raised position when said carriage reaches substantially its forwardmost position.

3. In a self-unloading ship having a hoppered hold with the openings of the hopper bottoms of predetermined extent fore-and-aft and the lower ends of the hopper bottoms spaced a distance apart approximating the fore-and-aft extent of the hopper bottom openings, tracks underlying the hopper bottoms, conveyors underlying the hopper bottoms below the tracks, and operating tunnels underlying the hoppers extending alongside the tracks; gates individual to the hopper bottoms movable along the respective tracks, said gates respectively comprising a carriage and a closure plate thereon of less extent fore-and-aft than the hopper bottom opening, a discharge member hinged to said carriage for swinging movement perpendicular to said plate extending forward therefrom, a cylinder at each side of said gate closed at its ends with a piston and a piston rod operating therein, one of said cylinder and piston rod being attached to said carriage and the other thereof being attached to a fixed support, the maximum stroke of said piston being less than the distance between adjacent hopper bottoms, means accessible from the operating tunnel for supplying pressure fluid to said cylinder at either end thereof selectively and exhausting fluid from the other end of said cylinder, said discharge member having a bottom wall cooperating with said plate for closing the hopper bottom opening when said carriage is in substantially its forwardmost position with said discharge member fully raised, and means for raising and lowering said discharge member responsive to travel of said carriage foreward and aftward, respectively, and returning it to fully raised position when said carriage reaches substantially its forwardmost position.

4. In a self-unloading ship having a hoppered hold with the openings of the hopper bottoms of predetermined extent fore-and-aft and the lower ends of the hopper bottoms spaced a distance apart approximating the fore-and-aft extent of the hopper bottom openings, tracks underlying the hopper bottoms, conveyors underlying the hopper bottoms below the tracks, and operating tunnels underlying the hoppers extending alongside the tracks; gates individual to the hopper bottoms movable along the respective tracks, said gates respectively comprising a carriage and a closure plate thereon of less extent fore-and-aft than the hopper bottom opening, a discharge member hinged to said carriage for swinging movement perpendicular to said plate extending forward therefrom, a cylinder at each side of said gate closed at its ends with a piston and a piston rod operating therein, said cylinder being attached to a fixed support and said piston rod extending aftward from said cylinder and being attached to said carriage, the maximum stroke of said piston being materially less than the distance between adjacent hopper bottoms, means accessible from the operating tunnel for supplying pressure fluid to said cylinder at either end thereof selectively and exhausting fluid from the other end of said cylinder, said discharge member having a bottom wall cooperating with said plate for closing the hopper bottom opening when said carriage is in substantially its forwardmost position with said discharge member fully raised, and means for raising and lowering said discharge member responsive to travel of said carriage foreward and aftward, respectively, and returning it to fully raised position when said carriage reaches substantially its forwardmost position.

5. In a self-unloading ship having a hoppered hold with the openings of the hopper bottoms of predetermined extent fore-and-aft and the lower ends of the hopper bottoms spaced a distance apart approximating the fore-and-aft extent of the hopper bottom openings, tracks underlying the hopper bottoms, conveyors underlying the hopper bottoms below the tracks, and operating tunnels underlying the hoppers extending alongside the tracks; gates individual to the hopper bottoms movable along the respective tracks, said gates respectively comprising a carriage and a closure plate thereon of less extent fore-and-aft than the hopper bottom opening, a discharge member hinged to said carriage for swinging movement perpendicular to said plate extending forward therefrom, power means controlled from the operating tunnel for moving said carriage fore-and-aft along the track to desired extent with the maximum travel of said carriage in either direction less than the distance between the lower ends of adjacent hopper bottoms, said discharge member having a bottom wall cooperating with said plate for closing the hopper bottom opening when said carriage is in substantially its forwardmost position with said discharge member fully raised, operating arms mounted for swinging movement about the hinge axis of said discharge member fixed to the latter, and means cooperating with said arms whereby said discharge member is swung downward and upward responsive to travel of said carriage aftward and forward and is returned to its fully raised position when said carriage reaches substantially its forwardmost position.

6. In a self-unloading ship having a hoppered hold with the openings of the hopper bottoms of predetermined extent fore-and-aft and the lower ends of the hopper bottoms spaced a distance apart approximating the fore-and-aft extent of the hopper bottom openings, track underlying the hopper bottoms, conveyors underlying the hopper bottoms below the tracks, and operating tunnels underlying the hoppers extending alongside the tracks; gates individual to the hopper bottoms movable along the respective tracks, said gates respectively comprising a carriage and a closure plate thereon of less extent fore-and-aft than the hoppered bottom opening, a discharge member hinged to said carriage for swinging movement perpendicular to said plate extending forward therefrom, power means controlled from the operating tunnel for moving said carriage fore-and-aft along the track to desired extent with the maximum travel of said carriage in either direction less than the distance between the lower ends of adjacent hopper bottoms, said discharge member having a bottom wall cooperating with said plate for closing the hopper bottom opening when said carriage is in substantially its forwardmost position with said discharge member fully raised, operating arms mounted for swinging movement about the hinge axis of said discharge member fixed to the latter and extending generally forward from said axis, and flexible members anchored at one end to fixed points and attached at their other end to said arms forward of said hinge axis whereby said discharge member swings downward in the aftward travel of said carriage and upward in the forward travel thereof and is returned to substantially fully raised position when said carriage is moved to substantially its forwardmost position.

7. In material handling means comprising a material supporting structure provided with delivery openings spaced a predetermined distance apart, a track underlying said openings, the latter being of predetermined extent lengthwise of said track, a conveyor underlying said track, and an operating tunnel underlying said structure extending alongside the track; gates individual to said openings movable along said track, said gates respectively comprising a carriage and a closure plate thereon of less extent fore-and-aft than the opening, a shaft rockably mounted on said carriage transversely and adjacent the forward end thereof, a discharge chute fixed to said shaft extending forward therefrom, operating arms fixed to said shaft extending forward therefrom at the sides of said carriage, flexible members anchored at their upper ends to fixed points above said carriage and attached at their lower ends to the forward ends of said arms, said flexible members extending downward and forward when said carriage is in its forwardmost position and being of such length that said discharge chute is then held in fully raised position, said chute comprising a bottom wall and side flanges and cooperating with said plate to close the opening when said carriage is in its forwardmost position, said chute swinging downward under control of said flexible members in the aftward travel of said carriage and being swung upward by said flexible members in the forward travel of said carriage, and power means controlled from the operating tunnel for moving said carriage fore-and-aft along the track.

8. In means for controlling discharge of material from a structure having a bottom opening, a track underlying said structure, a conveyor underlying said track, a gate comprising a carriage movable along the track fore-and-aft thereof for respectively closing and uncovering said opening, a closure plate on the carriage of less extent lengthwise of said track than said opening, a discharge member hinged to said carriage for swinging movement perpendicular to said plate extending forward therefrom, power cylinder means for moving said carriage along the track in either direction to desired extent with the maximum travel of the carriage in either direction substantially less lengthwise of the track than said opening, and flexible means anchored at one end to a support and attached at its other end to said closure member whereby the latter is lowered in the travel of the carriage in one direction for uncovering said opening and is raised in the travel of the carriage in the opposite direction for closing said opening, said flexible means being of such length that said discharge member is in substantially fully raised position when the carriage is in substantially its forwardmost position.

9. In combination, a material supporting structure having a bottom opening, a track underlying said opening, a gate underlying said opening movable in either direction along said track comprising a closure plate of materially less extent lengthwise of said track than said opening, a discharge member hinged on said gate for swinging movement perpendicular to said plate and extending away therefrom, said member having a bottom wall providing in cooperation with said plate a closure for said opening, when said gate is moved along said track in one direction to closed position with said discharge member in substantially fully raised position, power cylinder means for moving said gate along said track to desired extent in either direction with the maximum travel of the gate in either direction approximating the length of said plate, and flexible means anchored at one end to a fixed point above said gate and attached at its other end to said discharge member forward of the hinge axis thereof whereby said discharge member is lowered in the travel of the gate in the other direction for uncovering said opening and is raised in the travel of the gate in said one direction for closing said opening, said flexible means being of such length that said discharge member is in substantially fully raised position when said gate is in closed position.

10. In combination, a material supporting structure having a bottom opening, a track underlying said opening, a gate underlying said opening movable in either direction along said track comprising a closure plate of materially less extent lengthwise of said track than said opening, a discharge member hinged on said gate for swinging movement perpendicular to said plate and extending away therefrom, said member having a bottom wall providing in cooperation with said plate a closure for said opening, when said gate is moved along said track in one direction to closed position with said discharge member in substantially fully raised position, power cylinders mounted on fixed supports at the sides of the gate each comprising a cylinder closed at its ends with a piston operating therein and a piston rod operating through one end of the cylinder, said piston rods being attached to said gate and the maximum stroke of said pistons approximating the length of said plate, flexible members at the sides of said gate each anchored at its upper end to a fixed point above said gate and attached at its other end to said discharge member forward of the hinge axis thereof whereby said closure member is lowered in the travel of the gate in the other direction for uncovering said opening and is raised in the travel of the gate in said one direction for closing said opening, said flexible means being of such length that said discharge member is in substantially fully raised position when said gate is in closed position.

11. In combination, a material supporting structure having a bottom opening, a track underlying said opening, a gate underlying said opening movable forward and aftward along said track to open position and closed position, said gate comprising a closure plate of materially less length than said opening, a shaft rockably mounted on said gate transversely and adjacent the forward end thereof, a discharge chute fixed to said shaft extending forward therefrom, operating arms fixed to said shaft extending generally forward therefrom at the sides of said chute, flexible members anchored at their upper ends to fixed points above said shaft approximately in vertical alignment therewith and attached at their lower ends to the forward ends of said arms whereby said chute swings downward in the opening movement of said gate and is swung upward in the closing movement of said gate and into substantially fully closed position when said gate reaches its substantially fully closed position, power cylinders mounted on fixed supports adjacent the forward portion of said opening each comprising a cylinder closed at both ends with a piston operating therein and a piston rod extending through the aftward end of the cylinder attached to said gate, the maximum stroke of said pistons approximating the length of said plate, and means for admitting pressure fluid to either end of said cylinders selectively and exhausting fluid from the other end thereof.

JOHN F. MEISSNER.

No references cited.